July 19, 1932.   F. L. MORSE   1,868,334

DRIVE CHAIN

Filed March 21, 1929

INVENTOR
Frank L. Morse
BY
Lynne, Todd & Lechner
ATTORNEYS

Patented July 19, 1932

1,868,334

UNITED STATES PATENT OFFICE

FRANK L. MORSE, OF ITHACA, NEW YORK, ASSIGNOR TO MORSE CHAIN COMPANY, OF ITHACA, NEW YORK, A CORPORATION OF NEW YORK

DRIVE CHAIN

Application filed March 21, 1929. Serial No. 348,816.

This invention relates to chains used for power transmission, such as the so-called silent chains for example, and is particularly concerned with the arrangement of the pintle parts or joints about which the chain articulates.

In the ordinary types of power chains the centers of articulation are located at or near the centers of the pintle parts, for example, where a round pin is used, the center of articulation of the joint is located at the center of the pin, and even with rocker joints and other types the center is substantially so located in or about the center of the joint.

In certain special types this has not been the case, and the joints have been designed with arcuate bearing faces whose common centers of curvature were located well to one side or the other of the center of the joint. In these cases where the center of curvature of the bearing parts was located at some geometrical point outside of the joint, the point was generally placed forward of the joint in the direction of motion of the chain when running, to obtain a more nearly tangential engagement of the sprocket when running upon it. However, in some modifications the geometrical centers were located in the opposite direction backward of the joint. But so far as I am aware, in any of these chains where the articulation was not centrally located, all the joints of a given chain were alike, that is, the centers all located either forward of the joint, or all located backward of the joint, so that the effective pitch of all the links was the same.

In the present invention, where the centers of articulation are located to one side or the other of the centers of the joints, the centers of articulation are arranged on alternate or different sides of the joints in different links of the same chain, with the result that the effective pitch by which is meant the distance between centers of articulation is longer or shorter in different portions of the same chain, though the chain will run on an ordinary sprocket having uniformly spaced teeth. The principal purpose of this is to break up rythmic vibrations that sometimes cause trouble in chain drives. This and other objects, together wth the general manner of accomplishing the result, will become apparent as the description proceeds.

Referring now to the drawing.

Figure 1:
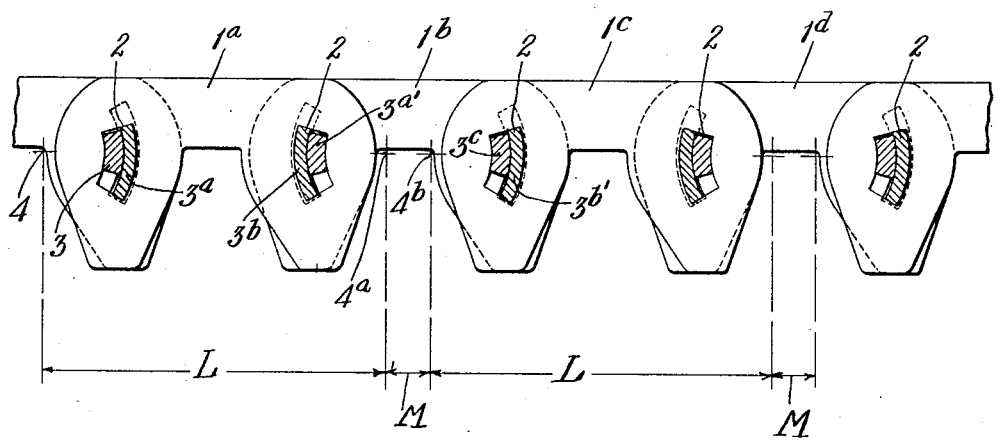
Fig. 1 is a side view of a portion of a chain illustrating the invention in one preferred form, the end washers being omitted in order to show the arrangement and form of the joints.

Referring now to Fig. 1, the chain is shown as built up of groups of links plates $1a$, $1b$, $1c$, $1d$, etc., connected together by pintles 2 which may be of one or more parts, as is well known in the art.

In Fig. 1 I have illustrated two part pintles for example, and their chief characteristic, so far as the present invention is concerned, is that they are of the displaced center type, that is, their center of curvature or center of action is eccentric to or offset from the joint, and that in some joints these centers are forward and in some backward of the joint. For example, in the first joint of the link $1a$, the pintle 2 is made up of two parts, 3 and $3a$ having arcuate bearing surfaces whose center of action or curvature is located at the point 4, to the left of the joint. The second joint of the link $1a$, connecting it to the link $1b$, comprises the pintle parts $3a'$ and $3b$, having arcuate bearing surfaces whose center of curvature is located at the point $4a$ to the right of the joint. Since the first joint of the link $1a$ turns about the geometric point 4 and the second joint of that link turns about the geometric point $4a$, the effective pitch of the link $1a$ may be considered as equal to the distance L as indicated between the dotted lines.

In the next link $1b$, the first joint is the same as the second joint of the link $1a$ already considered, having its center of action at the point $4a$, and the second joint of the link $1b$ is made up of the pintle parts $3b'$ and $3c$, having arcuate bearing surfaces whose center of curvature is located at the point 4b, to the left of the joint. The effective pitch or length of the link 1b may be considered as equal to the distance M between the points 4a and 4b. It will thus be seen that the effective length of the link 1a is considerably greater than that of the link 1b, the centers of action of the points of the link 1a being thrown outward and the centers of action of the link 1b being thrown inward.

Link 1c is similar to the link 1a first described, and link 1d is similar to the link 1b, and the chain may be built up to any desired length in that manner with alternately outwardly and inwardly facing joints, and alternate longer and shorter effective pitch lengths.

Figure 2:
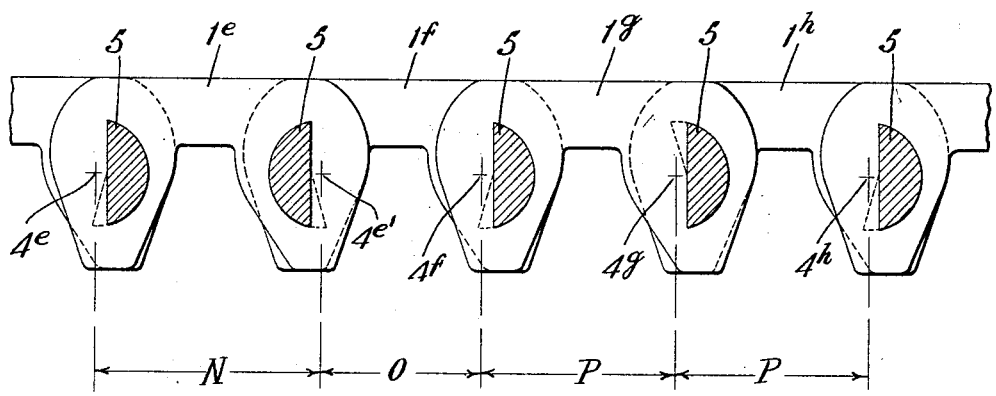
Fig. 2 is a similar view of another modification, showing that the alternations or arrangements of different effective pitches need not necessarily be built up in any regular pattern or system, and also illustrating a simpler and less expensive form of joint and chain construction.

It is not necessary, however, that the links be arranged in regular alternation, since they may also be arranged in any irregular or non-harmonic pattern desired. By way of illustration another example is shown in Fig. 2, in which the link 1e has outwardly facing joints, the link 1f inwardly facing joints, and the links 1g and 1h have joints all facing to the left. This gives a chain with links such as 1e having an effective pitch N somewhat longer than the normal effective pitch, links 1f having an effective pitch O somewhat shorter than the normal effective pitch, and links such as 1g and 1h having pitches of normal length P. It will be evident that any number of arrangements may be used, in the light of the principles described. For example, some of the joints may have their centers of articulation centrally located, as in the ordinary pin or rocker joints and others may have their centers of articulation offset.

In Fig. 1 an illustrative form of two part pintle 2 was shown, and in Fig. 2 one part pintles 5 are used. It will be evident that the invention is not restricted to any particular form of pintle, so long as its center of action is eccentrically displaced, or at least differs in some way in different joints to permit the variation in effective pitch length above described. In Fig. 2 the pintles 5 have arcuate faces on which the links can turn, the centers of curvature of the arcuate faces being located at the points 4e, 4e', 4f, 4g and 4h, and the operation will be evident from the foregoing.

While I have shown and described specific embodiments of the invention, it will be understood that they are merely by way of illustration to make clear the principles thereof, and that the invention is susceptible to various modifications and adaptations in different installations as will be apparent to those skilled in the art without departing from the scope of the invention as set forth in the following claims.

I claim:—

1. In a chain for power transmission, the combination of links and joints connecting said links, said joints having centers of articulation differently located in different links to provide a variety of effective pitch lengths in the same chain.

2. In a chain for power transmission, the combination of links and joints connecting said links, said joints being of a type having their centers of action offset with respect to the physical centers of the joints themselves, and certain of the joints facing in one direction and the remaining joints in another direction.

3. In a drive chain, the combination of joints, the center of curvature of some of which is located rearwardly of the joint with respect to the direction of pull of the chain and the center of curvature of the remainder being located forwardly of the joint with respect to the direction of pull of the chain whereby a variety of effective pitch lengths may be provided in the same chain.

In testimony whereof I have hereunto signed my name.

FRANK L. MORSE.